United States Patent [19]
Blalock et al.

[11] Patent Number: 5,949,167
[45] Date of Patent: Sep. 7, 1999

[54] LEAD WIRE ROUTING AND SEALING ASSEMBLY FOR LARGE ELECTRIC MOTOR

[75] Inventors: Christopher A. Blalock, Ellenboro, N.C.; Phillip E. Hayes, The Woodlands, Tex.

[73] Assignee: Reliance Electric Industrial Company, Cleveland, Ohio

[21] Appl. No.: 09/120,705

[22] Filed: Jul. 22, 1998

[51] Int. Cl.⁶ .............................. H02K 5/04; H02K 5/22
[52] U.S. Cl. ........................ 310/71; 310/89; 310/67 R; 174/65 R
[58] Field of Search ................... 310/67 R, 71, 310/89, 52, 55, 56, 57, 58; 174/18, 17 CT, 17 R, 65 R; 200/3.2

[56] References Cited

U.S. PATENT DOCUMENTS

| | | | |
|---|---|---|---|
| 1,799,071 | 3/1931 | Smith | 310/71 |
| 2,683,227 | 7/1954 | Beckwith | 310/55 |
| 3,012,159 | 12/1961 | Druesedow | 310/71 |
| 3,808,489 | 4/1974 | Albright et al. | 310/52 |
| 3,903,441 | 9/1975 | Towne | 310/71 |
| 4,121,126 | 10/1978 | Armor et al. | 310/59 |
| 4,451,750 | 5/1984 | Heuer et al. | 310/88 |
| 4,712,029 | 12/1987 | Nold | 310/71 |
| 4,781,610 | 11/1988 | Mercer | 310/68 C |
| 5,192,888 | 3/1993 | Fleer | 310/71 |
| 5,553,730 | 9/1996 | Kohnen | 220/3.2 |
| 5,648,694 | 7/1997 | Kobayashi et al. | 310/87 |

FOREIGN PATENT DOCUMENTS

| | | | |
|---|---|---|---|
| 220721 | 4/1962 | Austria | H02K 5/22 |
| 52-57907 | 5/1977 | Japan | H02K 3/50 |
| 57-78346 | 5/1982 | Japan | H02K 5/22 |
| 58-224536 | 12/1983 | Japan | H02K 5/132 |

OTHER PUBLICATIONS

JP Abstract 1–283040, Kano, Nov. 1989.
JP Abstract 4–117150, Nakamura et al., Apr. 17, 1992.
JP Abstract 8–182244, Yutaka, Jul. 12, 1996.

*Primary Examiner*—Nestor Ramirez
*Assistant Examiner*—Burt Mullins
*Attorney, Agent, or Firm*—Craig N. Killen; John M. Miller; John J. Horn

[57] ABSTRACT

Lead wires of large electric motors are routed through annular shrouds located inside of the motor housing to surround respective stator coilheads. Each of the shrouds includes at least one attachment portion defining an opening for passage of the leads. In one embodiment, a support element defining a lead channel aligns with the lead opening. The support element includes a mounting structure for attachment of a conduit box thereon. A seal arrangement having a planar seal element may be provided in the lead channel to support and separate the individual leads, while providing a seal to inhibit passage of cooling air from the housing interior into the conduit box. In another embodiment, a cover arrangement is attached directly to the attachment portion of the shroud. The cover arrangement may include a flexible gasket juxtaposed to a rigid cover plate.

17 Claims, 6 Drawing Sheets

FIG. 8

LEAD WIRE ROUTING AND SEALING ASSEMBLY FOR LARGE ELECTRIC MOTOR

BACKGROUND OF THE INVENTION

The present invention relates generally to the construction of large electric motors and the like. In particular, the present invention relates to improvements in the manner in which the motor's lead wires are routed to the exterior of the motor housing.

Large electric motors and the like are typically equipped with a plurality of lead wires. The motor must have power leads, but various sensor and other accessory leads may also be provided. Often, the lead wires are routed through a lead channel throat mounted to the motor's housing. The lead channel throat, in turn, may support a conduit box in which the lead wires are connected to external equipment.

In the past, the lead channel throat has often been mounted near the axial midpoint of the motor housing. As a result, the lead channel may be exposed to heated cooling air circulating inside the motor. The heated air may pass through the lead channel into the conduit box, which may be undesirable for a variety of reasons.

Various gasket arrangements have been located at the lead channel throat to limit the flow of heated air into the conduit box. For example, some lead channel arrangements have been provided with a rubber gasket having holes for passage of the lead wires. The lead wire holes have often been cut or punched into the gasket at the time of assembly. In other arrangements, boots have been molded into neoprene gaskets. Tips of the boots can be cut off at the time of assembly to allow passage of the individual lead wires. This technique has been considered generally undesirable since there is not enough support for the leads.

SUMMARY OF THE INVENTION

The present invention recognizes and addresses the foregoing considerations and others of prior art constructions and methods. Accordingly, it is an object of the present invention to provide various novel arrangements for the routing of lead wires to the exterior of a motor housing.

It is a further object of the present invention to provide lead wire routing arrangements extending from a low pressure location in the cooling air path.

It is an additional object of the present invention to provide lead wire routing arrangements which serve to separate and support the individual lead wires.

It is a further object of the present invention to provide lead wire routing arrangements which yield various manufacturing efficiencies.

Some of these objects are achieved by an assembly for mounting a conduit box to a housing of an electric motor. The assembly comprises an annular shroud located internally of the motor housing at one axial end thereof. The shroud has an attachment portion defining a lead opening through which pass lead wires of the electric motor. A support element is also provided, defining a lead channel between respective first and second ends. The first end of the support element engages the annular shroud at the attachment portion such that the lead channel will substantially register with the lead opening. The second end of the support element includes a mounting structure for attachment of the conduit box thereto.

Preferably, the assembly may further comprise a seal arrangement through which lead wires of the electric motor extend. The seal arrangement is operative to inhibit flow of cooling air from the housing interior into the conduit box. In some exemplary embodiments, the seal arrangement may include a planar seal element having at least one lead hole defined therein. For example, the planar seal element may comprise a flexible seal diaphragm supported between opposed rigid frames. The planar seal element may define a plurality of spaced apart lead holes, such as lead holes produced by respective star cuts.

Other objects of the present invention are achieved by an assembly for allowing passage of lead wires from inside a housing of an electric motor. The assembly comprises an annular shroud located internally of the housing at one axial end thereof. The shroud has a first attachment portion defining a first lead opening for passage of lead wires of the electric motor. A first cover arrangement is fixedly connected to the first attachment portion of the annular shroud such that the lead opening is covered thereby. The first cover arrangement defines holes through which lead wires of the electric motor extend.

In some exemplary embodiments, the cover arrangement comprises a first cover gasket juxtaposed to a first rigid cover plate. Often, the first rigid cover plate may comprise an elongate slot aligned with a series of through holes defined in the cover gasket.

The annular shroud may further comprise a second attachment portion defining a second lead opening. In such embodiments, the second lead opening may be covered by a second cover arrangement fixedly connected to the second cover portion. The second cover arrangement may be configured so that it does not include lead holes extending completely therethrough.

Still further objects of the present invention are achieved by an assembly for allowing passage of lead wires from inside a housing of an electric motor. The assembly comprises first and second annular shrouds located internally of the housing at opposite axial ends to surround a respective coilhead. Each of the shrouds defines a lead opening for passage of lead wires of the electric motor. Power leads of the electric motor extend through the lead opening of the first annular shroud. Accessory leads of the electric motor extend through the lead opening of the second annular shroud.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, even though broader aspects are embodied in the present invention.

Figure 1:
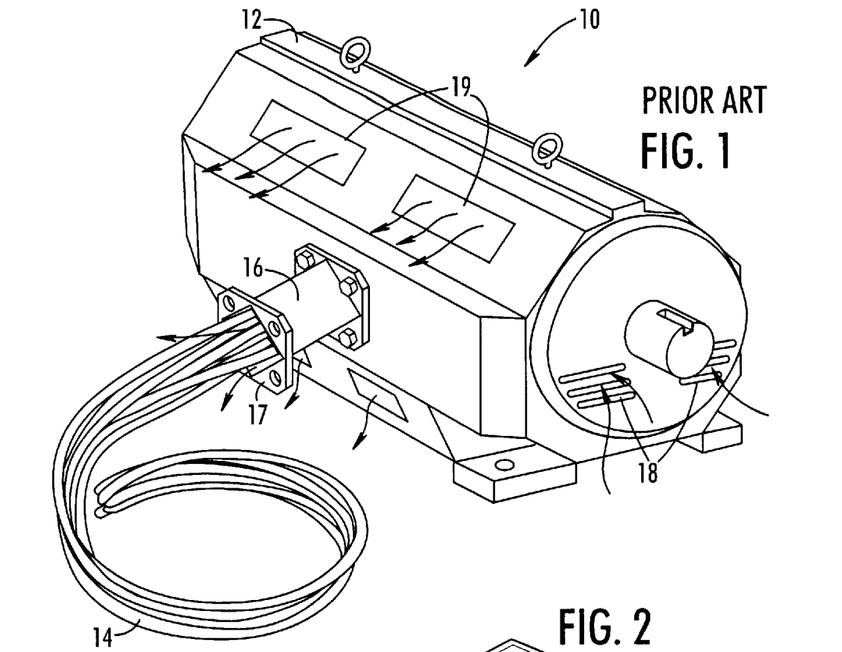
FIG. 1 is a perspective view of a large electric motor including a lead wire routing arrangement of the prior art.

Before proceeding to describe in detail the preferred embodiments of the present invention, it would be helpful to discuss the prior art in greater detail. Thus, FIG. 1 illustrates a large electric motor 10 constructed in accordance with the prior art. As can be seen, motor 10 includes a motor housing 12 having a plurality of lead wires (collectively 14) extending therefrom. The lead wires 14 pass through a throat element 16 attached to housing 12 at approximately the axial midpoint thereof. Throat element 16 includes a flange 17 to which a conduit box could be mounted.

Motor 10 may include an internal fan structure to pull in cooling air from the ambient environment, as indicated at 18. For example, the rotor of a large electric motor may be equipped with end vanes to circulate cooling air as the motor operates. Accordingly, the area at the axial ends of the motor housing may be considered a "low pressure" region drawing air into the motor housing. Between the ends of the housing, the air is pushed over the coilheads of the motor and about the stator core. As such, the axial interior of the motor housing can be considered a "high pressure" area.

Due to its location, the lead channel of throat element 16 may be exposed to heated cooling air circulating in the housing interior. In other words, air under pressure at this location will seek to exit the motor housing through any available path. Thus, in addition to passing from exhaust ports 19 as desired, the hot air may exit the motor housing by passing through throat element 16. Sealing gaskets can be provided in throat element 16 to impede the flow of hot air, but the gaskets themselves may leak under continuous pressure. As a result, heated air may undesirably escape into the conduit box.

Figure 2:
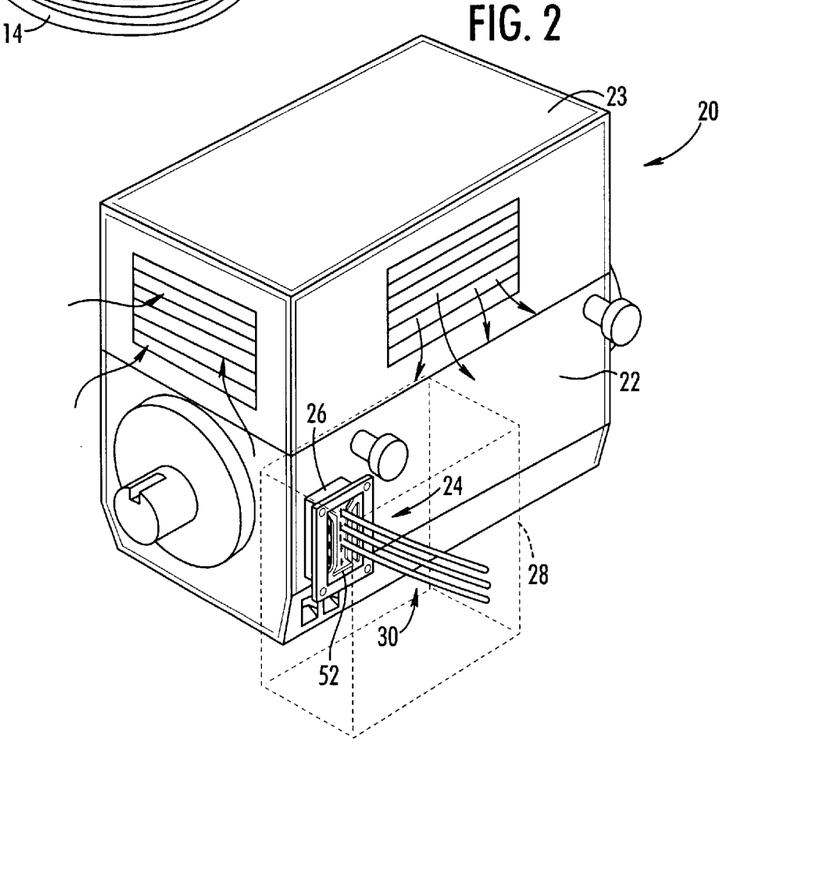
FIG. 2 is a perspective view of a large electric motor having a lead wire routing assembly constructed in accordance with one aspect of the present invention.

Referring now to FIG. 2, a motor 20 having a motor housing 22 is illustrated. A hood 23 is mounted above housing 22 in this case to route cooling air into and out of the motor in a conventional manner. A lead routing assembly 24, constructed in accordance with the present invention, includes a support element 26 to which a conduit box 28 (shown in phantom) is mounted. Lead wires, collectively 30, extend into conduit box 28 through a lead channel defined by support element 26.

Figure 3:
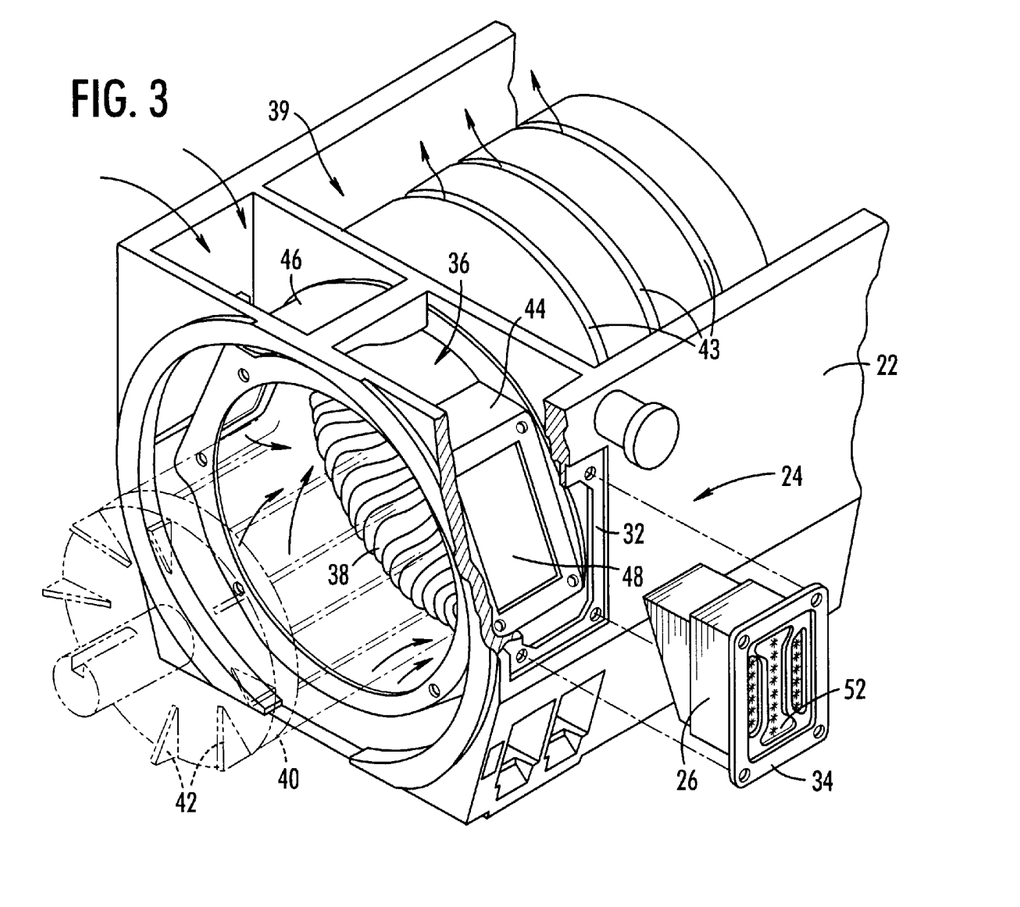
FIG. 3 is an enlarged and partially exploded view of the lead routing assembly of FIG. 2.
Figure 4:
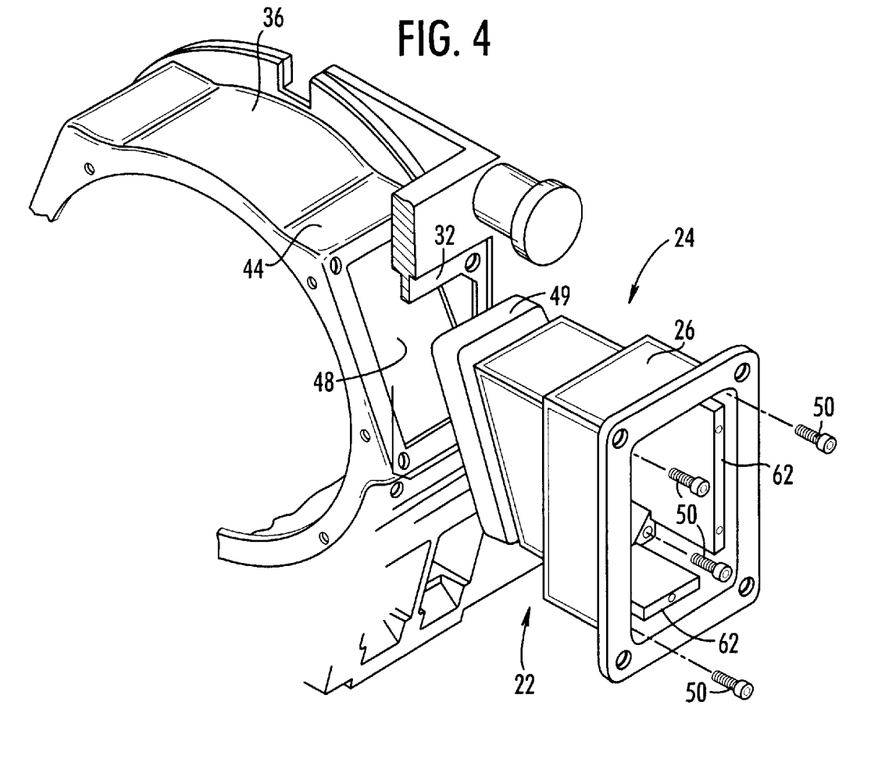
FIG. 4 is a further enlarged and partially exploded view of the lead routing assembly of FIG. 2, revealing various additional details.

Referring now also to FIGS. 3 and 4, additional details of lead routing assembly 24 will be explained. As can be seen, housing 22 includes a seat portion 32 defining an opening through which support element 26 extends. One end of support element 26 is thus located inside of housing 22. The other end of support element 26, located outside of housing 22, includes a mounting flange 34 for attachment of the conduit box.

Inside of housing 22, an annular shroud 36 encircles the "coilhead" 38 at the end of the motor's stator. As is well known to those skilled in the art, winding coils of the stator turn at the coilhead to extend along adjacent winding slots in the stator core 39. A rotor 40, shown here in phantom and partially removed for purposes of illustration, is located inside of stator core 39. The end face of rotor 40 defines a plurality of vane elements 42 which circulate cooling air during operation of the motor. The cooling air passes out of the stator core through axial ducts 43, as shown.

In this case, shroud 36 includes a pair of attachment portions 44 and 46 located on respective sides thereof. Each of the attachment portions preferably defines a respective lead opening, such as lead opening 48. Typically, only one of the lead openings will be used in a particular case. Two attachment portions are provided, however, for flexibility in the manufacturing process. The lead opening of the unused attachment portion can be simply covered by a suitable plate.

As can be seen, lead opening 48 aligns with the opening defined by seat portion 32 in the motor housing 22. When support structure 26 is inserted into the opening of seat portion 32, the end opposite to flange 34 engages attachment portion 44. The lead channel of support structure 26 will be in register with lead opening 48 so that the motor leads can be passed therethrough. A gasket 49 of neoprene sponge foam or other suitable material may be provided between the end face of support element 26 and the annular shroud. Any suitable attachment means, such as bolts 50 (FIG. 4), can be utilized to securely attach support element 26 to housing 22.

As can be seen, lead routing assembly 24 is advantageously located to extend from a low pressure region in the motor housing. The lower pressure at this location will tend to inhibit cooling air from passing through support element 26. A seal arrangement 52 (FIG. 3) may be provided inside of support element 26 to further inhibit air flow into the conduit box.

Figure 5:
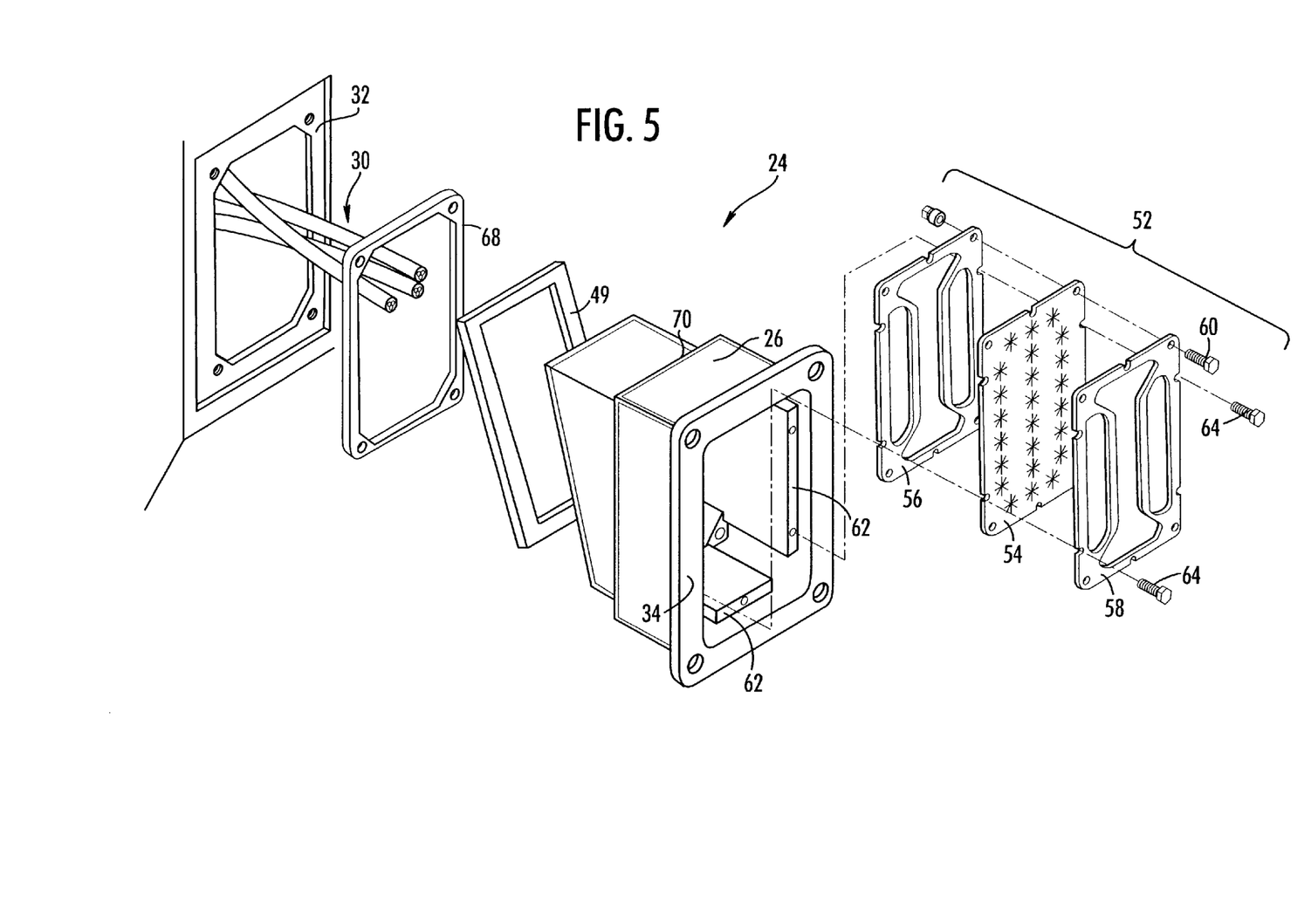
FIG. 5 is a further enlarged and partially exploded view of the lead routing assembly of FIG. 2, revealing various additional details.

Referring now to FIG. 5, the construction of seal arrangement 52 can most easily explained. As can be seen, seal arrangement 52 includes a planar seal element 54 situated between opposed rigid frames 56 and 58. A plurality of bolts, such as bolt 60, or other suitable means may be used to hold the pieces of seal arrangement 52 together. Seal arrangement 52 can then be seated against an abutment shoulder 62 inside of support element 26. Bolts, such as bolts 64, or other suitable means may be used to maintain seal arrangement 52 at this location.

Figure 6:
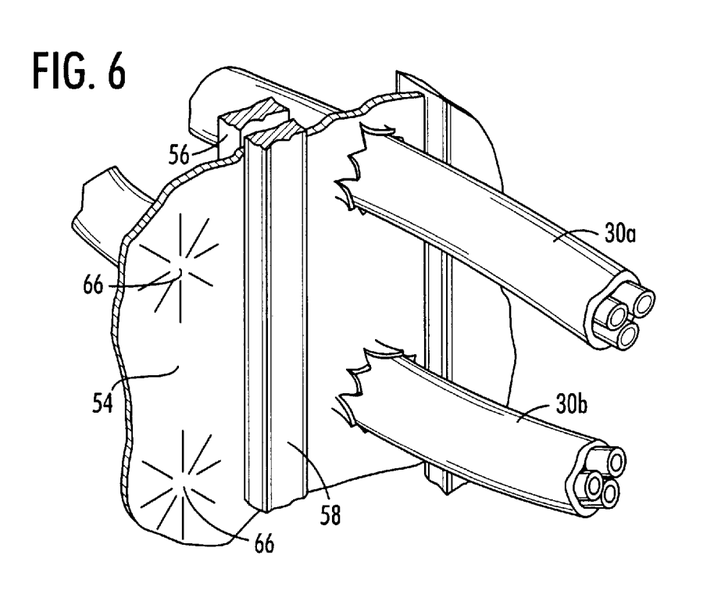
FIG. 6 is an enlarged fragmentary view of the flexible seal diaphragm utilized in the lead routing assembly of FIG. 2.

In presently preferred embodiments, planar seal element 54 is manufactured from a flexible but relatively supportive material such as a composite of neoprene and cloth mesh. As can be most easily seen in FIG. 6, a plurality of holes are defined in seal element 54 through which the respective lead wires can extend. In combination with rigid frames 56 and 58, seal element 54 serves to support and separate the individual lead wires, such as lead wires 30a and 30b. This is particularly desirable in the case of thick power leads, as illustrated. The individual lead holes may be preformed "star" cuts, such as those indicated at 66, to provide a relatively tight seal about the respective lead wires. Preferably, the star punch is not complete, but has an unpunched center portion to maintain the structural integrity of seal element 54 for unused punches.

Referring again to FIG. 5, gaskets are preferably provided at each interface of support element 26 and another surface. For example, gasket 49 has been described above. In addition, a gasket 68 may be provided between stepped portion 70 of support element 26 and seat portion 32 of housing 22. Often, it will be desirable for at least one surface of gasket 68 to have adhesive thereon. Although not shown, a gasket may also be provided between flange 34 and the conduit box mounted thereon.

Preferably, the motor will be constructed having annular shrouds located at both axial ends of the motor housing. In such embodiments, the power leads may exit housing 22 through one of the shrouds. Various accessory leads, such as leads extending from temperature detectors and the like, may exit through the shroud located at the opposite end.

Figure 7:
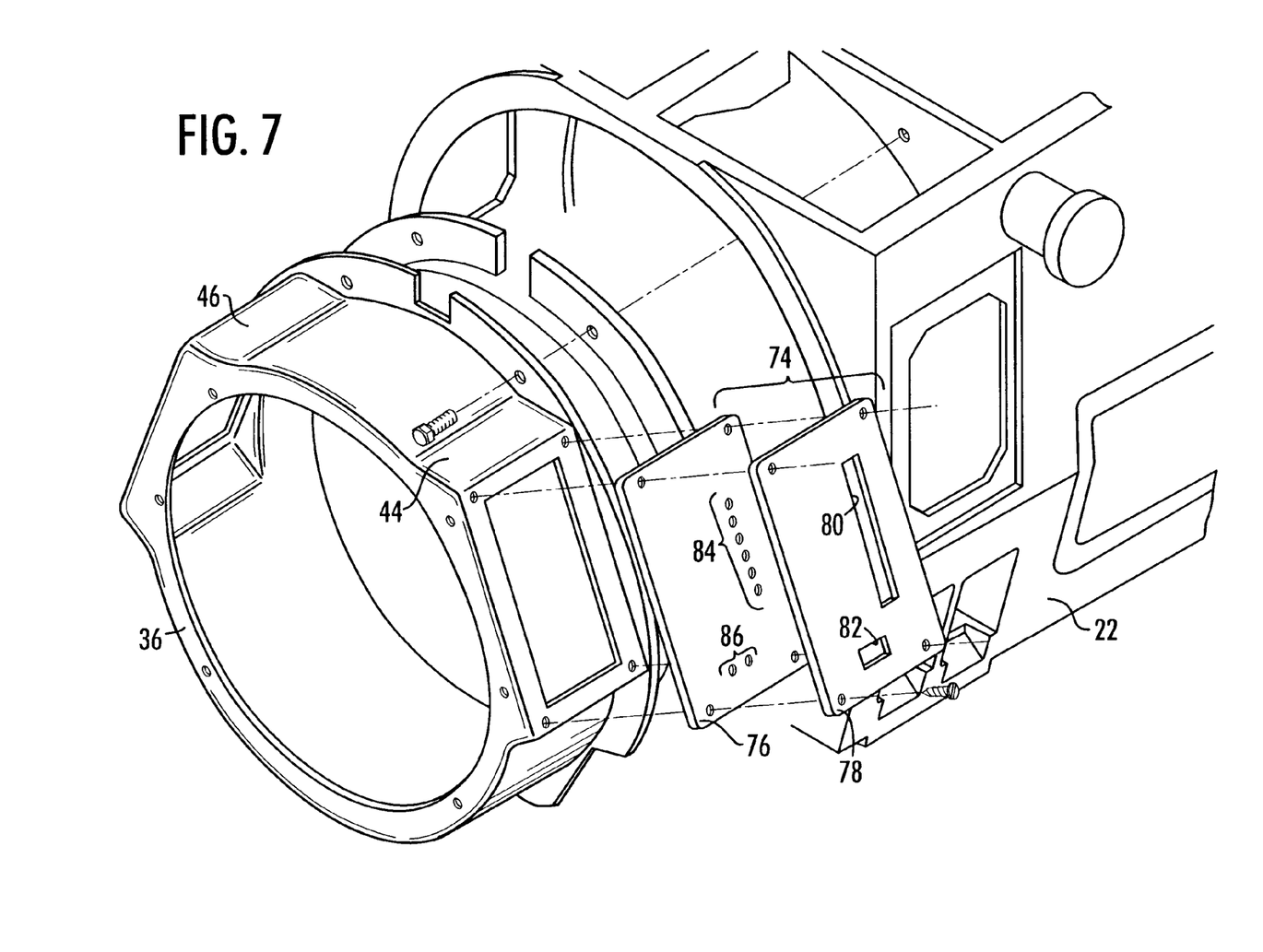
FIG. 7 is an enlarged exploded view of a lead routing assembly constructed in accordance with another aspect of the present invention.

Toward this end, FIG. 7 illustrates an alternative embodiment wherein shroud 36 is adapted for smaller accessory leads. In this case, a cover arrangement 74 through which the leads extend is connected directly to attachment portion 44 of shroud 36. As can be seen, cover arrangement 74 includes a cover gasket 76 juxtaposing a rigid cover plate 78. Cover plate 78 defines slots 80 and 82, each of which register with a series of lead holes defined in cover gasket 76 (and respectively indicated at 84 and 86).

The unused attachment portion may be covered with a similar cover arrangement that does not include lead holes.

Figure 8:
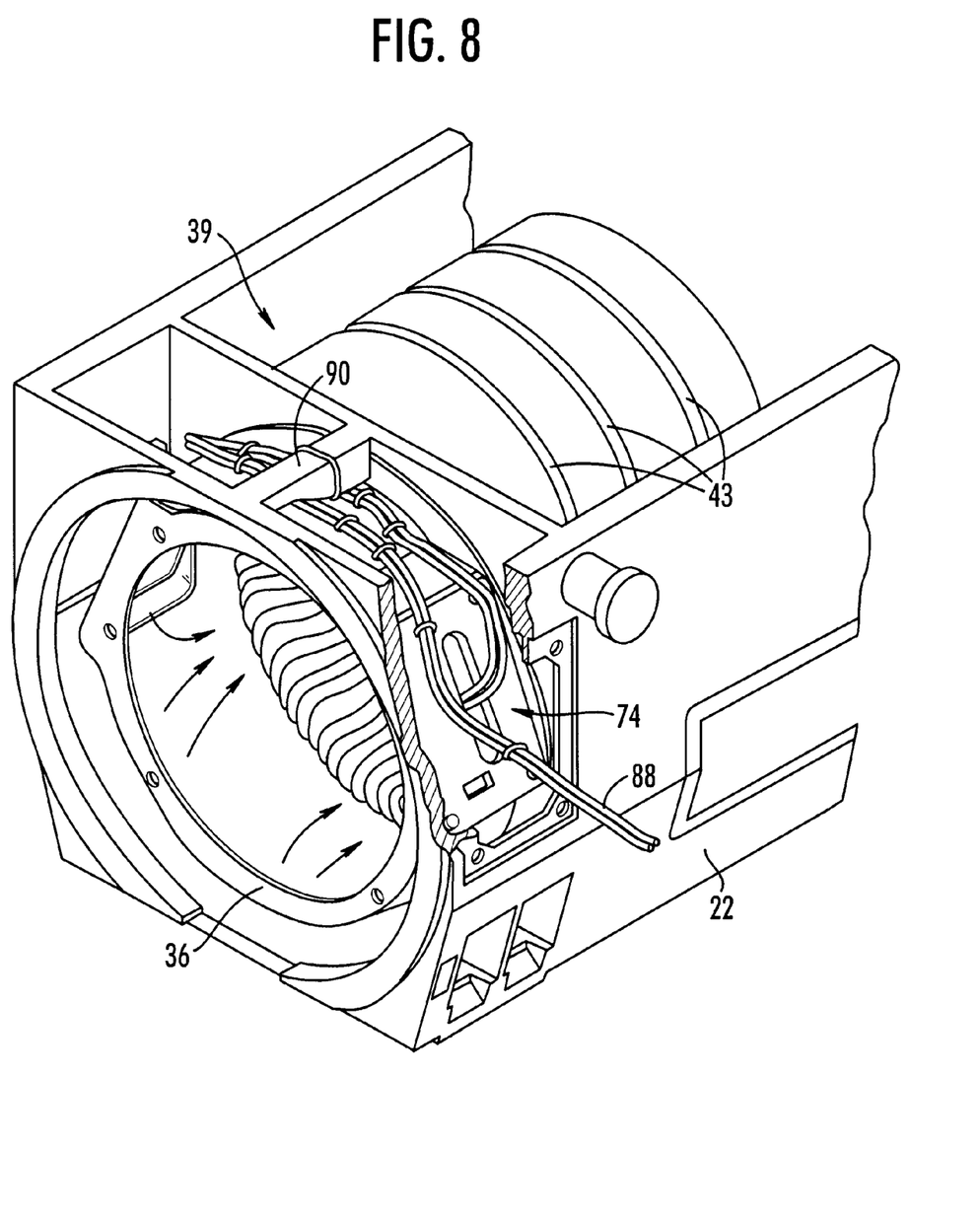
FIG. 8 is a perspective view of the lead routing assembly of FIG. 7 installed in the electric motor housing.

Referring now to FIG. 8, various accessory leads (collectively 88) are shown extending through cover arrangement 74. As can be seen, extra length is provided so that accessory leads 88 can pass from either side of housing 22. As shown, accessory leads 88 may be tied off at gusset 90 if they are to pass from the same side of housing 22 as the attachment portion of shroud 36 from which they extend.

It can thus be seen that the present invention provides novel lead wire routing and sealing assemblies for use with large electric motors. While preferred embodiments of the invention have been shown and described, modifications and variations may be made thereto by those of ordinary skill in the art without departing from the spirit and scope of the present invention, which is more fully set forth in the appended claims. In addition, it should be understood that aspects of the various embodiments may be interchanged both in whole or in part. Furthermore, those of ordinary skill in the art will appreciate that the foregoing description is provided by way of example only and is not intended to be limitative of the invention so described in such appended claims.

What is claimed is:

1. An assembly comprising:
   an electric motor having a stator and rotor located inside of a motor housing, said housing being configured to allow exchange of air between its interior and an ambient environment to facilitate cooling of said motor;
   an annular shroud located internally of said housing at one axial end of said stator, said shroud having an attachment portion defining a lead opening for passage of lead wires of said electric motor;
   a support element having a first end and a second end and defining a lead channel therebetween;
   said first end of said support element engaging said annular shroud at said attachment portion such that said lead channel will substantially register with said lead opening; and
   said second end of said support element including a mounting structure for attachment of the conduit box thereto.

2. An assembly as set forth in claim 1, further comprising a seal arrangement through which lead wires of said electric motor extend, said seal arrangement operative to inhibit flow of cooling air from the housing interior into the conduit box.

3. An assembly as set forth in claim 2, wherein said seal arrangement includes a planar seal element having at least one lead hole defined therein.

4. An assembly as set forth in claim 3, wherein said planar seal element has a plurality of spaced apart lead holes defined therein.

5. An assembly as set forth in claim 3, wherein said planar seal element comprises a flexible seal diaphragm supported between opposed rigid frames.

6. An assembly as set forth in claim 2, wherein said seal arrangement is located inside of said lead channel seated against an abutment shoulder defined by said support element.

7. An assembly as set forth in claim 1, wherein said annular shroud surrounds a coilhead of said electric motor.

8. An assembly as set forth in claim 1, wherein said mounting structure of said support element comprises a mounting flange.

9. An assembly for mounting a conduit box to a housing of an electric motor, said assembly comprising:
   an annular shroud located internally of said housing at one axial end thereof, said shroud having an attachment portion defining a lead opening for passage of lead wires of said electric motor;
   a support element having a first end and a second end and defining a lead channel therebetween;
   said first end of said support element engaging said annular shroud at said attachment portion such that said lead channel will substantially register with said lead opening;
   said second end of said support element including a mounting structure for attachment of the conduit box thereto; and
   a seal arrangement through which lead wires of said electric motor extend, said seal arrangement operative to inhibit flow of cooling air from the housing interior into the conduit box, said seal arrangement including a planar seal element having a plurality of spaced apart lead holes defined therein, said lead holes being defined by star cuts formed in said planar seal element.

10. An assembly comprising:
    an electric motor having a stator and rotor located inside of a motor housing, said housing being configured to allow exchange of air between its interior and an ambient environment to facilitate cooling of said motor;
    an annular shroud located internally of said housing at one axial end of said stator, said shroud having a first attachment portion defining a first lead opening for passage of lead wires of said electric motor; and
    a first cover arrangement fixedly connected to said first attachment portion of said annular shroud such that said lead opening is covered thereby, said first cover arrangement defining holes through which lead wires of said electric motor extend.

11. An assembly as set forth in claim 10, wherein said first cover arrangement comprises a first cover gasket juxtaposed to a first rigid cover plate.

12. An assembly as set forth in claim 10, wherein said annular shroud further comprises a second attachment portion defining a second lead opening.

13. An assembly as set forth in claim 12, wherein said second lead opening is covered by a second cover arrangement fixedly connected to said second attachment portion.

14. An assembly as set forth in claim 10, wherein said annular shroud surrounds a coilhead of said electric motor.

15. An assembly for allowing passage of lead wires from inside a housing of an electric motor, said assembly comprising:

an annular shroud located internally of said housing at one axial end thereof, said shroud having a first attachment portion defining a first lead opening for passage of lead wires of said electric motor; and a first cover arrangement fixedly connected to said first attachment portion of said annular shroud such that said lead opening is covered thereby, said first cover arrangement defining holes through which lead wires of said electric motor extend, said first cover arrangement having a first cover gasket juxtaposed to a first rigid cover plate, said first rigid cover plate comprising an elongate slot aligned with a series of through holes defined in said cover gasket.

16. An assembly for allowing passage of lead wires from inside a housing of an electric motor, said assembly comprising:

an annular shroud located internally of said housing at one axial end thereof, said shroud having a first attachment portion defining a first lead opening for passage of lead wires of said electric motor, said annular shroud further comprising a second attachment portion defining a second lead opening;

a first cover arrangement fixedly connected to said first attachment portion of said annular shroud such that said lead opening is covered thereby, said first cover arrangement defining holes through which lead wires of said electric motor extend; and a second cover arrangement fixedly connected to said second attachment portion and covering said second lead opening, said second cover arrangement being configured such that it does not include lead holes extending completely therethrough.

17. An assembly comprising:

an electric motor having a stator and rotor located inside of a motor housing, said housing being configured to allow exchange of air between its interior and an ambient environment to facilitate cooling of said motor;

first and second annular shrouds located internally of said housing at opposite axial ends of said stator to surround a respective coilhead;

each of said shrouds defining a lead opening for passage of lead wires of said electric motor;

power leads of said electric motor extending through said lead opening of said first annular shroud; and accessory leads of said electric motor extending through said lead opening of said second annular shroud.

* * * * *